United States Patent [19]

Bimba

[11] Patent Number: 4,643,332
[45] Date of Patent: Feb. 17, 1987

[54] TIE ROD CYLINDER WITH GASKETLESS SEAL

[76] Inventor: Charles W. Bimba, 9731 Newport Dr., Sun City, Ariz. 85351

[21] Appl. No.: 859,831

[22] Filed: May 5, 1986

[51] Int. Cl.⁴ ............................................... B65D 45/00
[52] U.S. Cl. ................................................... 220/327
[58] Field of Search ................................ 220/237, 327

[56] References Cited

U.S. PATENT DOCUMENTS

| | | | |
|---|---|---|---|
| 3,080,201 | 3/1963 | Escola | 220/327 |
| 3,141,008 | 7/1964 | Flick et al. | 220/327 |
| 3,175,725 | 3/1965 | Sampson | 220/327 |
| 3,245,708 | 4/1966 | Kooistra | 220/327 |

Primary Examiner—George T. Hall
Attorney, Agent, or Firm—Barry L. Clark

[57] ABSTRACT

Fluid cylinder of the repairable type having a plurality of tie rod members to retain a tubular member between a pair of end cap members is constructed so that the O-rings or gaskets normally used to seal the tubular member to the end caps can be eliminated. The tubular member is formed of a material such as stainless steel which is harder and has a higher yield strength that the material of the end caps, which is preferably an aluminum alloy. The mating surfaces are machined to be very smooth and flat so that the relatively thin wall of the tube will cause deformation of the end caps within their elastic limit, thus providing a metal to metal seal which permits the parts of the cylinder to be assembled and reassembled without danger of leakage. A surface finish on the mating parts of 32 microinches appears to be quite satisfactory.

8 Claims, 3 Drawing Figures

TIE ROD CYLINDER WITH GASKETLESS SEAL

BACKGROUND OF THE INVENTION

This invention relates to fluid cylinders, either gas or hydraulic, and particularly to repairable type fluid cylinders of the type comprising an assembly in which a tubular body portion is mounted between a pair of end cap members and retained relative thereto by a plurality of threaded tie rod members. The tie rod members are preferably located at a plurality of uniformly spaced locations around the outside of the tubular body portion and may comprise bolt and nut assemblies or merely bolts. In the former instance, the bolts would pass completely through the end caps so that a tightening of the nuts will retain the end caps and body portion. In the latter instance, one end cap would be internally threaded to receive and retain the threaded ends of the bolts, whose heads would engage the axially outer surface of the other end cap. Typically, the axially inner surfaces of the end caps are stepped so as to include a relatively short, axially extending boss portion of circular cross-section which is adapted to fit within one of the cylindrical ends of the tubular body portion to retain it against radial movement. The external periphery of each of the boss portions typically is grooved near its base to receive an elastomeric O-ring which is adapted to contact and form a seal with the inner wall of the tubular body portion placed over it. The O-ring keeps the cylinder from leaking but adds considerably to the expense of making the cylinder since, in addition to the cost of the O-ring, the groove must be machined. Also, a somewhat considerable effort is required to assemble the O-rings to the grooves and to then force the tubular body over the O-rings in order to assemble the tubular body to its end caps. Furthermore, when the tubular body is assembled to the end caps, there is a possibility that the elastomeric O-ring can be damaged. Obviously, it would seem desirable to be able to dispense with the use of an O-ring, but typical cylinders formed, for example, with tubular aluminum body portions and aluminum end caps have been found to be incapable of preventing leakage without the use of elastomeric sealing members such as O-rings. It has also been common to make cylinders where the sealing function is performed by a gasket member. However, in such constructions it is generally necessary to replace the gasket whenever the cylinder assembly is disassembled for repair. Also, the exact length of such cylinder assemblies cannot be assured since the tubular body member tube can be pressed into the gasket to varying degrees depending upon the amount of force applied to the tie bolts and the nature of the gasket material. Furthermore, gasket type seals cannot be satisfactorily used with cylinders which have very thin walls, such as is possible by using stainless steel, since the small dimension of the wall would possibly cut through the gasket material. In addition, where the cylinder is accidently overpressurized, it can be expected that the tie rods will stretch and allow the excess pressure to be released by leakage under the gasket. In such a situation it would be quite likely that the gasket would be forced out of position so that it would not reseal properly when the overpressure conditions was no longer present. In tests of several sizes of cylinders sealed with O-rings, it was found that in every instance that the cylinder was overpressurized sufficiently to cause leakage, the O-ring was extruded out of its groove. Furthermore, when the pressure was released, the O-ring was no longer able to reseal.

SUMMARY

It is among the objects of the present invention to provide a tie rod type cylinder which can be sealed without the need for separate elastomeric sealing members such as O-rings or gaskets. It is another object of the invention to provide an integral seal between different portions of the cylinder by the selection of different materials and thicknesses and an appropriate smoothness for the tubular body portion and the end caps.

The preceeding and other objects and advantages are achieved by the present invention wherein the cylinder assembly is characterized by having a relatively thin-walled tubular body portion of a relatively hard, high yield strength material such as stainless steel, in engagement with a much wider flat surface on the end cap portions which are formed of a relatively soft and relatively low yield strength material such as aluminum. Preferably, the thickness of the walls of the tubular body which contacts the end caps is quite small so as to produce a substantial contact pressure between the body and end caps which will force the tubular body to cause at least a slight deformation of the material of the end caps. Preferably, the contact pressure produced by tightening the tie rod bolts is below the pressure which would cause the end caps to exceed their yield point and undergo permanent, rather the elastic deformation.

It has been found that quite satisfactory seals can be achieved without the use of elastomeric sealing members such as gaskets and O-rings by forming the complementary mating surfaces of a cylinder assembly to be flat, normal to the cylinder axis and of a smoothness such that the surface finish of the mating surfaces will not exceed about 32 micro-inches. It has also been found that local dents, scratches or other damage to one or the other of the mating surfaces which have a dimension which does not exceed about 0.0005 inches can be tolerated. The required smoothness of the tubing ends can be achieved by trimming the tubing ends in a lathe. Although other materials can be used, it has been found desirable to form the tubular body member of type 304 stainless steel having a hardness of 25-35 Rockwell C, a tensile strength of 110-150,000 psi, and a yield strength of 75,000 psi. For the end caps, it has been found desirable to use an aluminum alloy, 2011-T3, which has a tensile strength of 55,000 psi and a yield of 43,000 psi. A range of cylinder sizes which would appear to work quite satisfactorily includes tubular members having internal diameters in the range of 0.5625-8.00". In stainless steel, the tubular members can have a wall thickness of about 0.020" or less for an internal diameter of 0.5625, or a wall thickness of about 0.028" for an internal diameter of 1.0625". A tube made of aluminum would typically have a wall several times as thick as required for stainless steel. For the aforementioned 0.5625" stainless steel tube, a 0.020" wall thickness is about 3.56% of the tube diameter while a 0.028" wall thickness for a 1.0625" tube is about 2.6% of the tube diameter. For an aluminum tube having an internal diameter of 1.0625", a wall of 0.100" would be 9.4% of the tube diameter. Because of the need for a greater wall thickness, the area of contact between the tubular body member and the end caps will be much greater for an aluminum body member than for a stainless steel one and thus the contact pressure between the tubular member and the end caps would be much less for an aluminum tubular member, for a given torque applied to the tie bolts, than for a stainless steel tubular member.

DETAILED DESCRIPTION OF THE DRAWINGS

Figure 1:
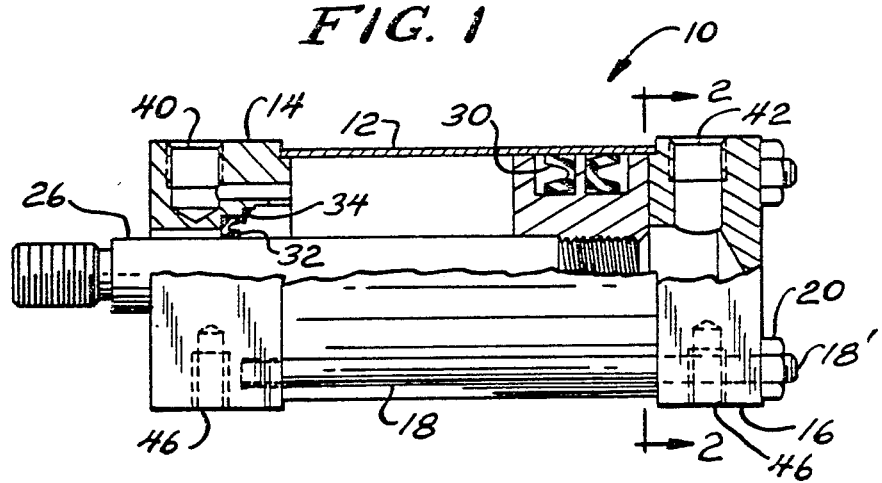
FIG. 1 is a partially broken away, partially sectioned view illustrating a tie rod cylinder having gasketless sealing which is constructed in accordance with the invention.
Figure 2:
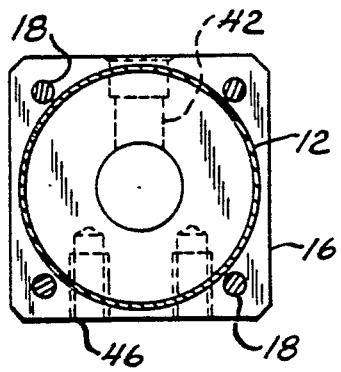
FIG. 2 is a vertical sectional view taken on line 2—2 of FIG. 1.

FIG. 1 shows a cylinder assembly indicated generally at 10 which includes a thin wall tubular body portion 12 mounted between a pair of end cap members 14, 16. A plurality of threaded tie rod bolts 18 are threadedly engaged with end cap member 14 and extend axially of the exterior surface of body portion 12 to and through the end cap member 16. Outer threaded end portions 18' on each bolt 18 are engaged by nut type fasteners 20 which may be torqued sufficiently to tension the bolts and thereby compress the tubular body portion 12 into contact with the end cap members 14, 16.

Aside from its capability of being sealed without O-rings and gaskets, the cylinder assembly 10 is generally conventional in that it includes a piston 24 mounted at the inner end of piston rod 26. It also includes a pair of elastomeric seals 30 for the piston. A rod seal 32 is provided for the piston rod 26 and is retained in the end cap 14 by a retaining ring 34. A pair of threaded ports 40, 42 in the end caps 14, 16 respectively, permit a fluid, which can be either hydraulic or gaseous, but is typically air, to be brought into or expelled from the cylinder. A pair of threaded openings 46 in each end cap 14, 16 permit the cylinder to be mounted to other structures.

Figure 3:
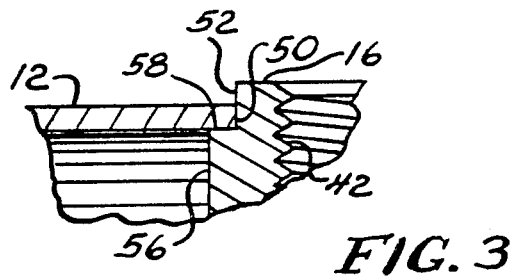
FIG. 3 is an enlarged view of a portion of FIG. 1 showing the relationship between the tubular body portion of the cylinder and an end cap.

The sealing structure of the cylinder assembly 10 is best illustrated in FIG. 3 wherein the flat end wall 50 of the tubular member 12 can be seen as contacting the flat surface portion 52 of the end cap member 16. The flat surfaces 50, 52 should be formed, such as by being turned in a lathe, so as to be parallel to each other and very flat. The flat surfaces permit a high pressure resistant seal to be formed when the tie rods 18 are tightened sufficiently to cause the flat end portions 50 of the tubular member 12 to slightly deform the flat end surfaces 52 of the end cap members. A boss portion 56 having a cylindrical outer surface 58 extends from the end cap member 16 and serves to radially position the tubular member 12 relative to the end cap. Unlike a conventional end cap which would require that the boss' outer surface have a considerable axial extent to accommodate a groove and an O-ring, the boss portion 56 can be quite short.

In an efforst to compare my repairable tie rod cylinder with its gasketless sealing to prior art cylinders using O-rings, tests were made using several bore sizes, specifically, 1.5", 2.0", 2.5", 3.25" and 4.0". The following statistics applied to the 2.0" bore, and are typical.

TUBING

I.D. 2.0"
Wall Thickness 0.035"
Material Type 304 Stainless Steel
Hardness 25–35 R
Tensile Strength
  Ultimate 110,000 to 150,000 P.S.I.
  Yield 75,000 P.S.I. minimum

END CAPS

Material Aluminum Alloy Type 2011-T3
Hardness 96 Brinell
Tensile Strength
  Ultimate 55,000 P.S.I.
  Yield 43,000 P.S.I.

TIE RODS

Diameter 0.25"
Material Carbon Steel Type AISI-1144
Tensile Strength
  Ultimate 120,000 P.S.I.
  Yield 100,000 P.S.I.

TIE ROD NUTS

Thread Size ¼"-28 UNF
Applied Torque 75 in. lbs.

The load produced in the 2.0" tube by the aforementioned torque will cause a compressive stress of 36,700 P.S.I. in the stainless steel tube and the aluminum end caps at the tube to aluminum sealing contact point. This is 85% of the yield strength of the aluminum and 50% of that of the stainless tube. The resulting elastic deformation of the aluminum is sufficient to provide a leak proof juncture of the two smooth surfaces even if local imperfections such as scratches, nicks or pits, for example, of 0.0005" depth are present. The smooth surfaces were measured as having a surface finish of about 32 microinches.

Although normal working pressures for air and oil are 250 P.S.I. or 1000 P.S.I., respectively, the gasketless design 2.0" tube began leaking at 2700 P.S.I.G. pressure. However, a seal was reestablished when the pressure was lowered to 2650 P.S.I.G. In a similar 2.0" cylinder utilizing conventional O-rings, leaking began at 4500 P.S.I.G. However, because the O-ring was destructively extruded into the tube/end cap gap, the unit required disassembly to repair. The destructive extrusion was found to occur in every test in which the cylinder was overpressurized enough to cause leakage.

I claim:

1. A repairable fluid cylinder of the type having a pair of axially spaced end cap members which are axially biased toward each other and towards the ends of a length of relatively thin wall tubing mounted between said end cap members by a plurality of tensioned tie-rod members located externally of said tubing, said cylinder being characterized in that the material of said tubing has a substantially higher yield strength and is harder than the material of said end cap members, the sole means for preventing fluid leakage between flat end surfaces on each end of said tubing and a complementary flat, inner end surface of the axially adjacent end cap member being a seal formed by the deformation of the flat inner end surface of the relatively soft end cap member when the complementary flat end surface of said relatively hard tubing is axially pressed against it by the tension in said tie rod members, said flat end surfaces of said tubing and said end cap members being formed so as to lie in parallel planes normal to the axis of the cylinder and tubing, said tubing end surfaces and the complementary flat end surfaces of the end cap members having a relatively smooth surface finish.

2. A repairable fluid cylinder in accordance with claim 1 wherein said relatively smooth surface finish of said complementary end surfaces has a surface roughness of no greater than about 32 micro inches.

3. A repairable fluid cylinder in accordance with claim 2 wherein none of the complementary mating surfaces of said tubing or end cap members contains a local dent, scratch or other surface deformation having a depth dimension in excess of 0.0005 inches.

4. A repairable fluid cylinder in accordance with claim 1 wherein the material of said tubing has a tensile strength and a yield strength which is of a value which is at least 50% greater than that of the end cap members.

5. A repairable fluid cylinder in accordance with claim 4 wherein said tubing is made of stainless steel and said end cap members are made of an aluminum alloy.

6. A repairable fluid cylinder in accordance with claim 1 wherein said tubing has a wall thickness dimension which is no greater than 4% of the internal diameter of said tubing.

7. A repairable fluid cylinder in accordance with claim 1 wherein said tubing has a wall thickness dimension which is no greater than 2.7% of the internal diameter of said tubing.

8. A repairable fluid cylinder in accordance with claim 1 wherein said plurality of tie rod members are tensioned sufficiently to cause the end surfaces of said tubing to elastically deform the complementary end surfaces of said end cap members.

* * * * *